Sept. 10, 1968      B. B. PAKULA      3,400,670

MOULDING MACHINE FOR MINIATURE BAKING PRODUCTS

Filed Oct. 21, 1966      3 Sheets-Sheet 1

INVENTOR.
BENARD BENNETT PAKULA
BY
ATTORNEY

Sept. 10, 1968  B. B. PAKULA  3,400,670
MOULDING MACHINE FOR MINIATURE BAKING PRODUCTS
Filed Oct. 21, 1966  3 Sheets-Sheet 2
FIG. 4
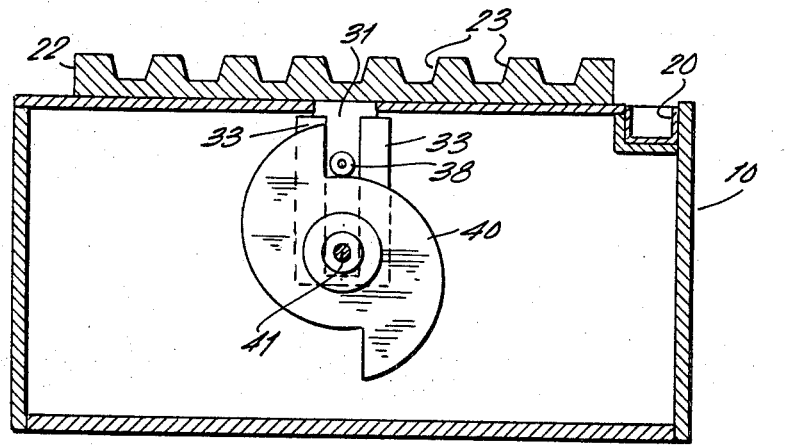
FIG. 5
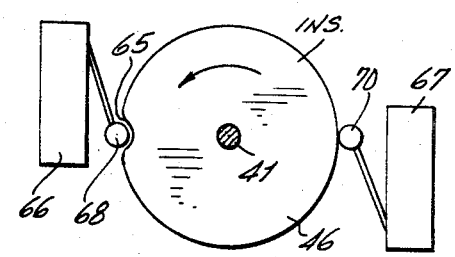
FIG. 6
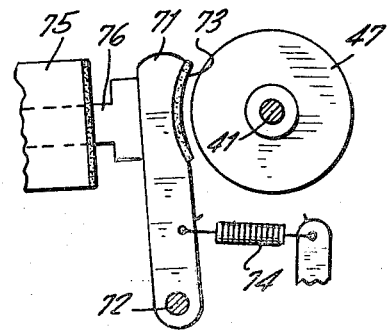
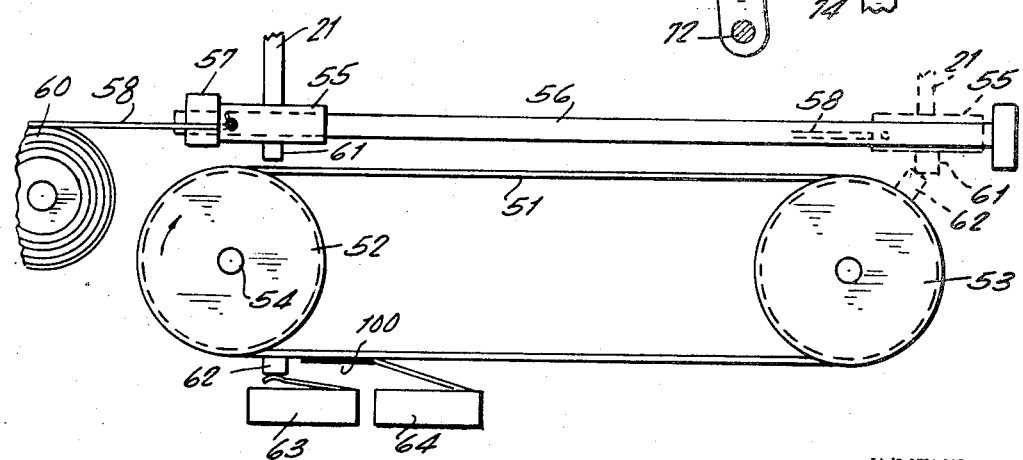
FIG. 7
INVENTOR.
BENARD BENNETT PAKULA
BY
ATTORNEY

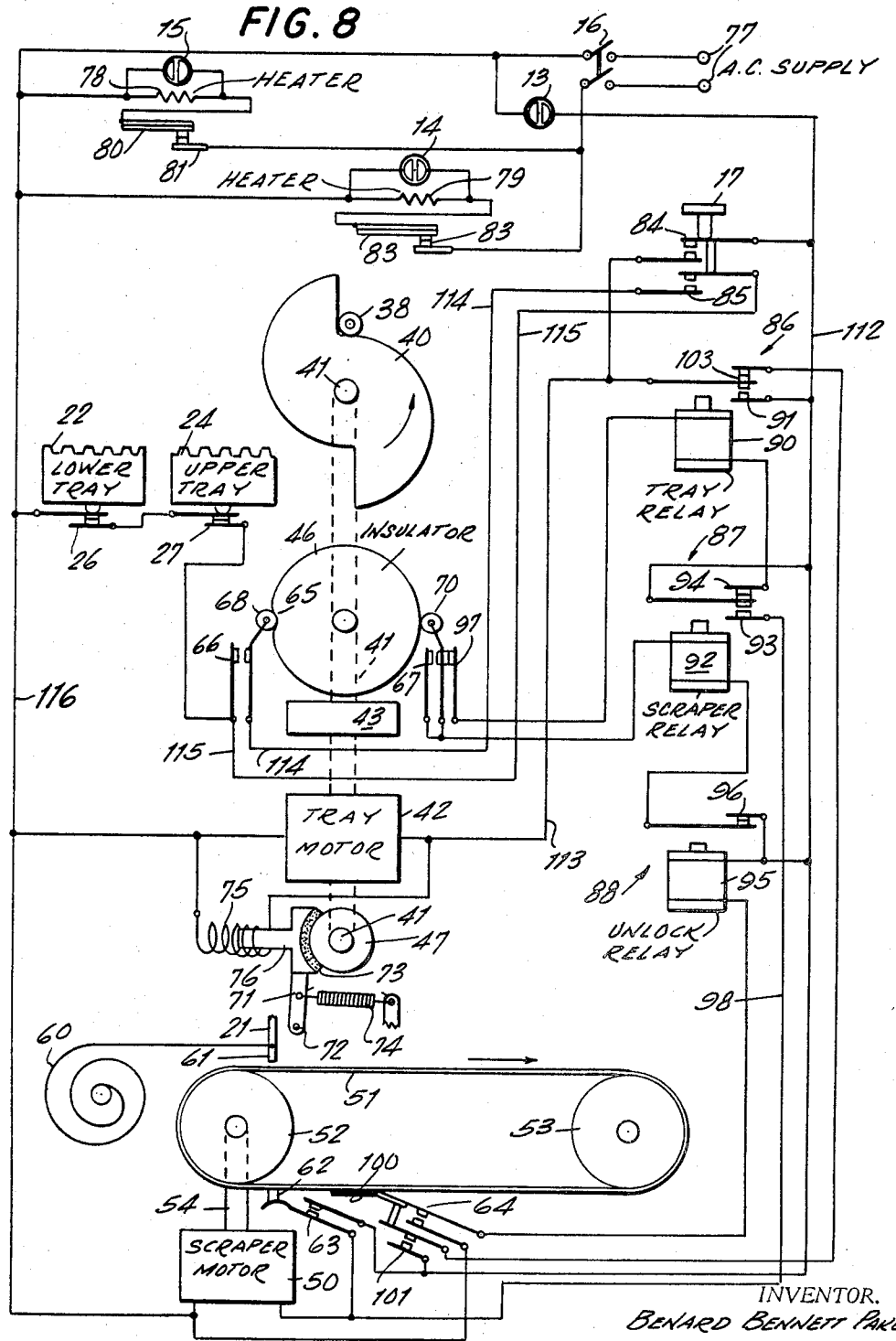

United States Patent Office 3,400,670
Patented Sept. 10, 1968

3,400,670
MOULDING MACHINE FOR MINIATURE
BAKING PRODUCTS
Benard Bennett Pakula, 12 Dalewood Ave.,
Suffern, N.Y. 10901
Filed Oct. 21, 1966, Ser. No. 588,492
8 Claims. (Cl. 107—4)

ABSTRACT OF THE DISCLOSURE

A machine for automatically moulding edible baked shell containers for foodstuffs in which complementary male and female dough forming plates are first brought together to initially form the dough into a plurality of shells and partially bake the dough therebetween by means of heating elements within the plates. The plates are then separated by a cam and a scraper removes the excess dough. The plates are then brought together to reshape the shells and finally again separated for removal of the shells.

---

This invention relates to a baking device for forming and partially baking shell containers of dough prior to their being filled with food, and particularly small shell containers for miniature tarts and the like.

The fabrication of small shell containers made of dough and containing various edible contents has been a problem for some time since it involves a great deal of skillful hand labor. The dough must be soft enough to shape into containers of a desired shape. The containers must be prebaked so that they can be removed from their cavities, filled with confection or other edible products. If the dough is too soft, it can not be removed from its cavity, and if the dough is baked until it is stiff it can not be baked again with a filling without rendering the dough too brittle for safe handling. Each container has heretofore been filled by hand and the dough carefully shaped. The present invention not only shapes the containers properly but also automatically fills, trims and prebakes the dough of the containers so that they may be removed from their cavities, filled, and again baked to produce a finished product.

An object of the present invention is to provide an improved automatic baking device which avoids the necessity of expensive, highly skilled hand operations.

Another object of the present invention is to prebake a container of dough so that it may be filled and moved to a baking sheet for final baking.

A further object of the present invention is to shape a container of dough so that it will not leak and will accommodate a desired amount of edible produce.

Still another object of the present invention is to provide sufficient strength to a plurality of containers of dough so that they may be manually handled.

The invention comprises a double tray, male and female die structure, which may be employed to produce a plurality of cuplike containers, prebaking the dough, scraping away the excess dough after forming, and then given a second cycle forming and heating to provide the desired container strength and shape.

A feature of the present invention includes the heating of both portions of the trays to a desired temperature to partially bake the dough.

Another feature of the present invention includes a forming cycle which compresses the dough within a die to produce the desired dough thickness and cavity volume.

The invention consists of the construction, combination and arrangement of parts, as herein illustrated, described and claimed.

In the accompanying drawings, forming a part hereof, there is illustrated one form of embodiment of the invention, in which drawings similar reference characters designate corresponding parts, and in which:

FIGURE 4 is a cross-sectional view of the lower half of the baking device showing the double-snail cam.

FIGURE 5 is a cross-sectional view of an insulator cam for operating two control switches.

FIGURE 6 is an end view of a braking system for stopping the tray motor after the lower tray has been lowered.

FIGURE 7 is a top view of a band device which moves the scrapper across the lower tray.

FIGURE 8 is a schematic diagram of connections showing all the electrical connections, including three relays which operate the device.

Figure 1:
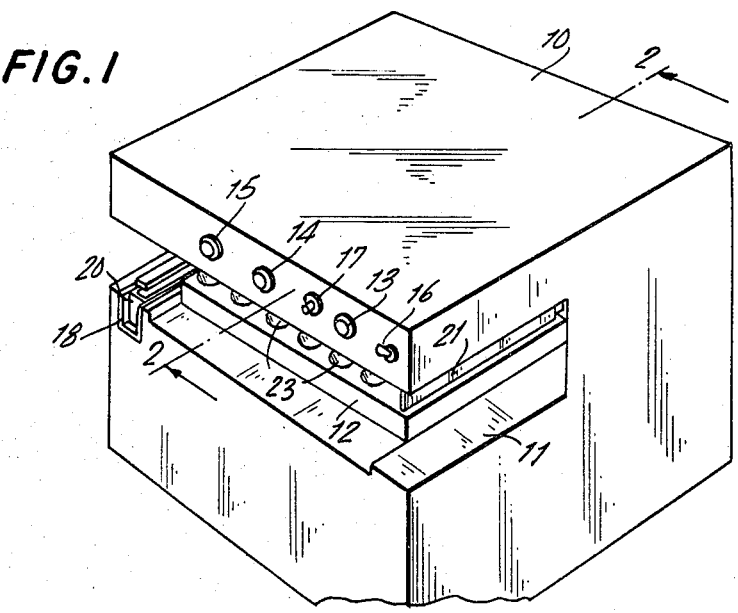
FIGURE 1 is an isometric view of the baking device, showing thhe slot for positioning the lower tray, and some of the controls on the upper front panel.

Referring now to the figures, the baking device 10 is shown enclosed within a cubic container and having a single slot 11 at the front thereof for inserting and removing the lower tray 12. On the upper front panel of the baking device 10 there are three indicator lights 13, 14 and 15. One power switch 16 and one start switch 17 are also mounted in this area. At the left side of the machine a channel 18 is provided for holding a tray 20. This tray 20 is disposed so as to receive the excess amount of dough which is scraped from the tops of the shells after one-half of the moulding interval in the hereinafter more fully described manner. The scrapper 21 is shown at the right hand side of the device in FIGURE 1.

Figure 2:
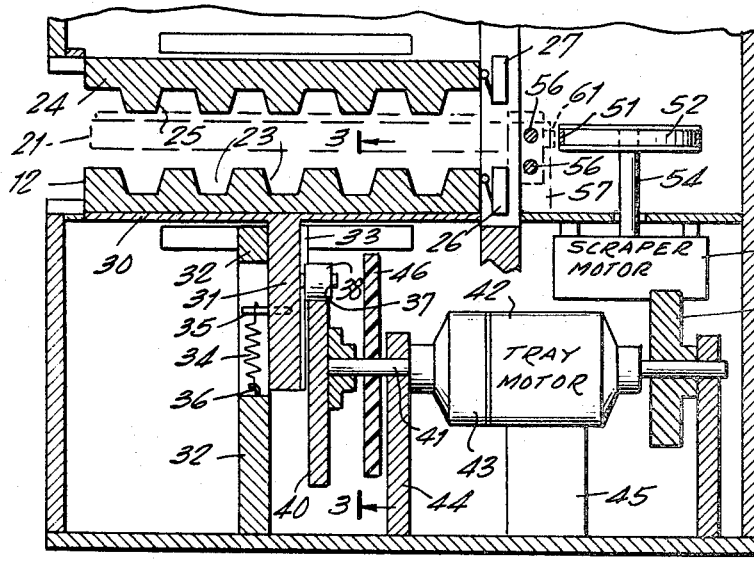
FIGURE 2 is a cross-sectional view of the baking device shown in FIGURE 1, and is taken along line 2—2 of that figure.

FIGURE 2 which is a cross-sectional view taken near the center of the machine shows the removable lower tray 12 which contains a plurality of cavities 23 where the dough is first positioned. Directly above the lower tray is male die 24, having extension 25 which are lowered into the cavities 23 of the tray 12, during the baking operation. The lower tray 23 limits against a switch 26 so that the device will not operate unless the lower tray is in its correct position with the cavities 23 in line with the extensions 25. In a similar manner, another switch 27 is mounted at the rear of the male die 24 so that it too must be in its operating position before the process can be started.

The lower tray 12 rests on a plate 30 which is connected to a rod 31 extending downwardly into the base portion of the machine and slidably held by means of a first plate 32 and flange plates 33. Rod 31 and plate 30 are yieldably held in the position shown in FIGURE 2 by a coil spring 34 which is secured at its upper end to a pin 35 carried by the rod 31, and at its lower end to a hook 36 secured to the lower portion of plate 32. Rod 31 also supports a stub shaft 37 having a roller 38 thereon. The roller 38 makes contact with a double-snail cam 40 shown in greater detail in FIGURE 4. The double-snail cam is secured to a shaft 41 which is turned by the tray motor 42 coupled to the shaft through a reduction gear 43. Shaft 41 is supported by a plate 44 and the tray motor 42 is secured to pedestal 45. Also secured to shaft 41 is a cam 46 of dielectric material (see FIGURE 5) and a brake disc 47 (see FIGURE 6).

The mechanism decribed above is for raising and lowering the lower tray 12. This action occurs twice for each cycle and after the first half-cycle when the dough is first shaped, a second motor 50 drives an endless band 51 mounted on two pulleys 52 and 53 to move a scraper 21 having a wiper blade 21A across the upper surface of the lower tray 12. This action scrapes away any excess dough which may have been squeezed out of the cavities onto the upper surface and deposits this excess into a receptacle 20. The scraper motor 50 is coupled to pulleys 52 and 53 by a shaft 54, through a reduction gear (not shown). Other details of this mechanism will be described later when the operation of the device is described.

Figure 3:
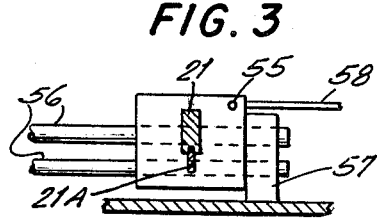
FIGURE 3 is a cross-sectional view of a portion of the baking device showing the details of the dough scraper.

FIGURE 3 shows some of the details of the scraper 21 and the scraper blade 21A. The scraper 21 is mounted on a rectangular plate 55 which slides on two horizontal rods 56 supported at each end by a block 57. Plate 55 is secured to a flexible cord 58 which is connected to a spiral spring 60. A pin 61 traverses plate 55 on the side adjacent to band 51 and is moved only when engaged by a detent 62, secured to the band 51. The detent as it moves around pulley 52 makes contact with the pin 61 to move it and the plate 55 along the rods 56 to carry the scraper bar 21 across the top of the lower tray 12. At the end of the travel the plate 55, pin 61 and scraper 21 are in the position shown in dotted lines in FIGURE 7. At this position detent 62 is carried around pulley 53 and becomes disengaged from the pin 61. When this occurs, the spiral spring 60 returns the cord 58 and plate assembly 55 to its original position. In order to control the operation of the band 51, motor 50, and scraper 21, three switches 63, 101, and 64, are mounted in the position shown in FIGURES 7 and 8, to normalize the scraper action. Additional details of this action will be discussed later.

As shown in FIGURE 5, the insulator cam 46 is provided with a depressed portion 65 and two operating switches 66 and 67. When the insulator cam is in its normal position, cam follower 68 is positioned within the recess 65 while cam follower 70 rests on the surface of the cam. The operation of this device will be discussed later.

FIGURE 6 shows some of the details of the brake mechanism which include the brake disc 47 secured to shaft 41 and a brake arm 71 pivoted on a stub shaft 72. A friction pad 73 is secured to the brake arm for making contact with the periphery of brake disc 47. The brake arm is normally resiliently held in its braking position against disc 47 by means of a helical spring 74. The brake is released as shown in FIGURE 6, only when current is applied to a solenoid coil 75 which attracts solenoid core 76 and pulls the brake arm away from disc 47.

Referring now to FIGURE 8, the complete wiring diagram is shown together with many of the mechanical and electrical components of the device. Terminals 77 are for connection to an alternating current power supply of about 120 volts and switch 16 connects the power to the baking and control circuits. Indicator lamp 13 is bridged across the switch terminals and indicates when the power is applied. A first heater 78 is installed adjacent to the upper tray for heating it to a predetermined pre-baking temperature. Indicator lamp 15 is bridged across the heater and shows when the current is applied. A bimetallic thermal element 80 is mounted adjoining the upper tray 24 and, with series contacts 81, provides a substantially constant temperature. A similar heater 79 is mounted adjacent to the lower tray 21 and has its indicator lamp 14, bimetallic strip 82, and series contacts 83. Each of these heater assemblies is bridged across the two supply conductors 112 and 116.

In order to control the operations of the baking device, three relays 86, 87 and 88, are connected in the control circuit. The start button 17 is arranged to close two pairs of normally open contacts 84 and 85. Contacts 84 are connected in series with the tray motor 42 and supply conductors 112, 113. The other side of the tray motor is connected to supply conductor 116. Contacts 85 are connected in series with conductors 114, 115 bridged across contacts 66 in order to activate the tray relay 86 when the operation starts. The tray relay 86 includes a winding 90, a pair of normally open contacts 91 connected across contacts 84, and a pair of normaly closed contacts 103.

The scraper relay 87 includes a winding 92, a pair of normally open contacts 93, and a pair of normally closed contacts 94. These contacts form a single pole, double throw switch which activates either the tray motor 42 or the scraper motor 50.

The unlock relay 88 includes a winding 95 and a pair of normally closed contacts 96 which are connected between the supply conductor 112 and the winding 92 of the scraper relay. The winding 95 of the unlock relay is connected in series between conductor 112 and contacts 64, operated by detent 62 near the end of the travel of belt 51.

The operation of the control circuit is as follows: At the start, the cams, contacts and belt are in the position shown in FIGURE 8. After filling the tray cavities 23 with small quantities of dough, the operator slides the tray 12 into the slot 11 and presses the start button 17, after the tray 12 has closed the switch 26, at the rear of slot 11. Contacts 84 and 85 are thereby closed and a circuit is completed from conductor 112, through contacts 84, tray motor 42, to the other supply conductor 116. This starts the tray motor and rotates the insulator cam 46. When contacts 85 are closed, a circuit is completed which may be traced from conductor 116, contacts 26 and 27, over conductor 115 to contacts 85, then back over conductor 114, contacts 97, winding 90 of the tray relay, closed contacts 94 and to supply conductor 112. Contacts 85 are bridged across contacts 66 and, as soon as the cam 46 has moved enough to close contacts 66, the operator may release the start button 17. This circuit activates the tray relay, closing contacts 91 and opening contacts 103. This circuit holds the tray relay in its activated condition until cam 46 has made one-half revolution. The closing of contacts 91 keep the tray motor 42 turning.

The tray motor continues turning, raising the lower tray 12 by turning cam 40 to compress and form the dough in cavities 23, by the action of the die 24. Then, when the cam 40 has been turned one-half revolution, cam follower 38 is released as it enters the cam step, and spring 34 pulls the tray 12 down into its original position. At this time the cut-out portion 65 in cam 46 is under cam follower 70, and contacts 97 are opened and contacts 67 are closed. When contacts 97 are opened, the holding circuit is broken and contacts 91 on the tray relay are opened, thereby stopping the tray motor 42 and applying brake 73 under the tension by spring 74. When contacts 67 are closed, a circuit is completed which may be traced from conductor 116, closed contacts 66, closed contacts 67, winding 92, contacts 96, to the other conductor 112. This circuit activates the scraper relay 87, opening contacts 94 and closing contacts 93, thereby sending current from conductor 112 through contacts 93, over conductor 98, to the scraper motor 50, and the other supply conductor 116.

The above circuit action starts the scraper motor and shaft 54 turns pulley 52 to move band 51 around pulleys 52 and 53. Detent 62 is moved by the band and makes contact with pin 61 to carry the scraper 21 and its blade 21A over the lower tray 12 to scrape away any excess dough that may have been squeezed out above the top level of the lower tray. During this action, the tray motor 42 and the cam 46 do not move and cam follower 70 is resting in the recess of cam 40. When the detent 62 turns around pulley 53, pin 61 is released and the spiral spring 60 returns the scraper to its original position. Detent 62 continues in its movement and soon makes contact with a switch arm 100 and contacts 64 and 101 are closed. Contacts 64 send current to the unlock relay winding 95, opening contacts 96 and breaking the holding circuit which kept the scraper relay activated. Contacts 101 send current from supply conductor 112 over conductor 102 to contacts 103 and the tray motor 42, starting it and again turning cam 46. The contact switch arm 100 is made long enough so that contacts 101 are held together for a time which is sufficient to move the depression 65 away from follower 70, and again close contacts 97. The closure of contacts 97 again activates the tray relay 86, closes contacts 91, and the tray motor continues to turn.

When the scraper relay is normalized, contacts 94 are closed and the circuit to activate the tray relay is complete. It should be noted that the opening of contacts 93 would stop the scraper motor but at this time contact 63 are still closed and current for motor 50 flows through these contacts until contacts 63 are opened by detent 62.

The tray motor 42 continues to turn for the second half of a complete revolution of cam 40, again raising the lower tray 22 to nest momentarily with the upper tray. This nesting reforms the shells. The action is completed when depression reaches the start position and cam follower 38 drops into it, opening contacts 66. This action removes current from the tray motor, and opening contacts 91 to stop the motor 42. The circuit is now in its original or start position. Tray 17 can be taken out of the machine, the formed and partially baked shells removed for filling and subsequent final baking, and new dough added to the cavities. The filled tray 12 is again placed in the machine and a new cycle can be started by repressing the start button 17.

The control circuit described above is only one of several circuits which may be used to produce the desired cycle of events. It is obvious that other circuits may be substituted for the described circuit without departing from the spirit of the invention.

Having thus fully described the invention, what is claimed as new and desired to be secured by Letters Patent of the United States, is:

1. An automatic baking device for shaping and partially baking a plurality of dough elements comprising a housing, a vertically reciprocable support carried by the housing, a tray on said support formed with shaped cavities for carrying the dough elements, a male die plate formed with extensions for relative movement into said cavities to form the dough elements into a desired shape, heater means for heating the tray and the die plate to a predetermined temperature to partially bake the dough, power means for moving the support and the tray into moulding engagement with the die plate to form the dough elements, a scraper mounted for horizontal movement across the upper surface of the tray for removing any excess dough that may be ejected from the cavity, and control means for sequentially operating the power means to move the tray into moulding engagement with the die plate, return the tray to its start position, operate the scraper to scrape the excess dough from the tray, and operate the power means a second time to return the tray to its moulding position to finish the dough forming operation.

2. A baking device as claimed in claim 1 wherein said tray is driven by a snail cam and an electric motor for moving it vertically into and out of engagement.

3. A baking device as claimed in claim 1 wherein said scraper includes a metal bar secured to a slidable plate mounted on two rods and a flexible scraper blade secured to the metal bar for frictional engagement with the top surface of the tray.

4. A baking device as claimed in claim 1 wherein an endless band is mounted on two pulleys, said band being secured to a detent which engages a portion of the scraper to move the scraper across the tray and then disengage the scraper mechanism.

5. A baking device as claimed in claim 1 wherein a resilient spring means is coupled to the tray support to return the tray to its starting position after release by the snail cam.

6. A baking device as claimed in claim 2 wherein said snail cam contains two snail cam faces whereby one complete revolution of the cam raises and lowers the tray support twice.

7. A baking device as claimed in claim 1 wherein a dielectric cam is coupled to the snail cam and includes a recessed portion adapted to operate at least two spaced pairs of contacts for controlling the sequential operation of the device.

8. A baking device as claimed in claim 2 wherein the tray and the die plate are coupled respectively to an electrical switch to close the switch contacts only when the plates are in aligned operating condition, said switches being connected in series with said control means for operating the motor to move the tray into moulding engagement with the die plate.

References Cited
UNITED STATES PATENTS

| | | | |
|---|---|---|---|
| 1,480,284 | 1/1924 | Mignerey | 107—58 |
| 1,844,339 | 2/1932 | Shaw | 107—66 X |
| 2,089,923 | 8/1937 | Leaf et al. | 107—58 |
| 3,290,154 | 12/1966 | Turner | 107—54 |

WALTER A. SCHEEL, Primary Examiner.

J. SHEA, Assistant Examiner.